Dec. 8, 1953    H. A. LINES    2,661,757
CONTROL APPARATUS FOR DIVIDING FLUID FLOW MECHANISMS
Filed Dec. 18, 1951    2 Sheets-Sheet 1

INVENTOR
Harold A. Lines
BY
Bucknell Bartholow
ATTORNEYS

Dec. 8, 1953

H. A. LINES 2,661,757

CONTROL APPARATUS FOR DIVIDING FLUID FLOW MECHANISMS

Filed Dec. 18, 1951

INVENTOR
Harold A. Lines
BY
Rockwell & Bartholow
ATTORNEYS

Patented Dec. 8, 1953

2,661,757

UNITED STATES PATENT OFFICE 2,661,757

CONTROL APPARATUS FOR DIVIDING FLUID FLOW MECHANISMS

Harold A. Lines, Hamden, Conn., assignor to Fluid Systems, Incorporated, Hamden, Conn., a corporation of Connecticut Application December 18, 1951, Serial No. 262,294

6 Claims. (Cl. 137—118)

This invention relates to a fluid flow control apparatus, and more particularly to a device for regulating the flow of fuel so that a uniform and constant quantity will always be delivered to a point of consumption regardless of variation in the resistance to flow between the source of supply and the point of delivery.

It sometimes occurs that when a liquid, for example, is pumped from a source of supply to a point of consumption or delivery, it is desirable to use a pump of excess capacity with respect to the amount of liquid which is normally used, and return the excess fluid which is not used to the tank or other source of supply. In such case usually a constant displacement pump is employed so that a constant quantity of the fluid will be delivered. It can then be determined what portion of this quantity is to be delivered at the point of consumption, and the present invention relates to a device for maintaining the proportion or amount constant regardless of differences or variations in the resistance to the flow of the liquid as might arise from changes of viscosity or for other reasons.

Specifically the invention is illustrated as applied to the control of oil, for example, to a burner or other point of delivery. As illustrated, the oil is pumped from a tank over a divided path so that a portion is returned to the tank and a portion delivered to the burner. Each of the paths is provided with a valve which may be adjusted or set to deliver a certain proportion or quantity of oil to the burner. However, as changes in the resistance to flow occur in one path, relatively to that in the other, due to the changes in viscosity of the oil due to changes in temperature, the quantity of oil delivered to the burner would vary and would require further adjustment of the valves.

According to the present invention, however, means are provided so that regardless of changes in resistance to flow, the flow will remain constant for any given setting of the valves whereby when these valves have once been set to deliver the proper amount of oil to the burner or other point of delivery, this quantity will always be delivered regardless of changes which might occur.

One object of the invention is to provide a flow control for liquids such that the fluid from a single source of supply will be delivered to a point of delivery in a quantity which will be uniform and constant.

Another object of the invention is to provide a flow control device such that the fluid from a single source of supply may be divided so as to flow along a number of paths and the quantity which flows in one path remains uniform and constant regardless of any changes which might occur in the resistance to flow.

Still another object of the invention is to provide a fluid control apparatus such that when the fluid is pumped from a source of supply by a constant displacement pump thus delivering a constant volume to the line, the fluid may be divided into two paths and so controlled that the ratio of the quantity of fluid flowing through one path to the entire quantity of fluid delivered by the pump will always remain uniform and constant.

To these and other ends the invention consists in the novel features and combinations of parts to be hereinafter described and claimed.

Figure 1:
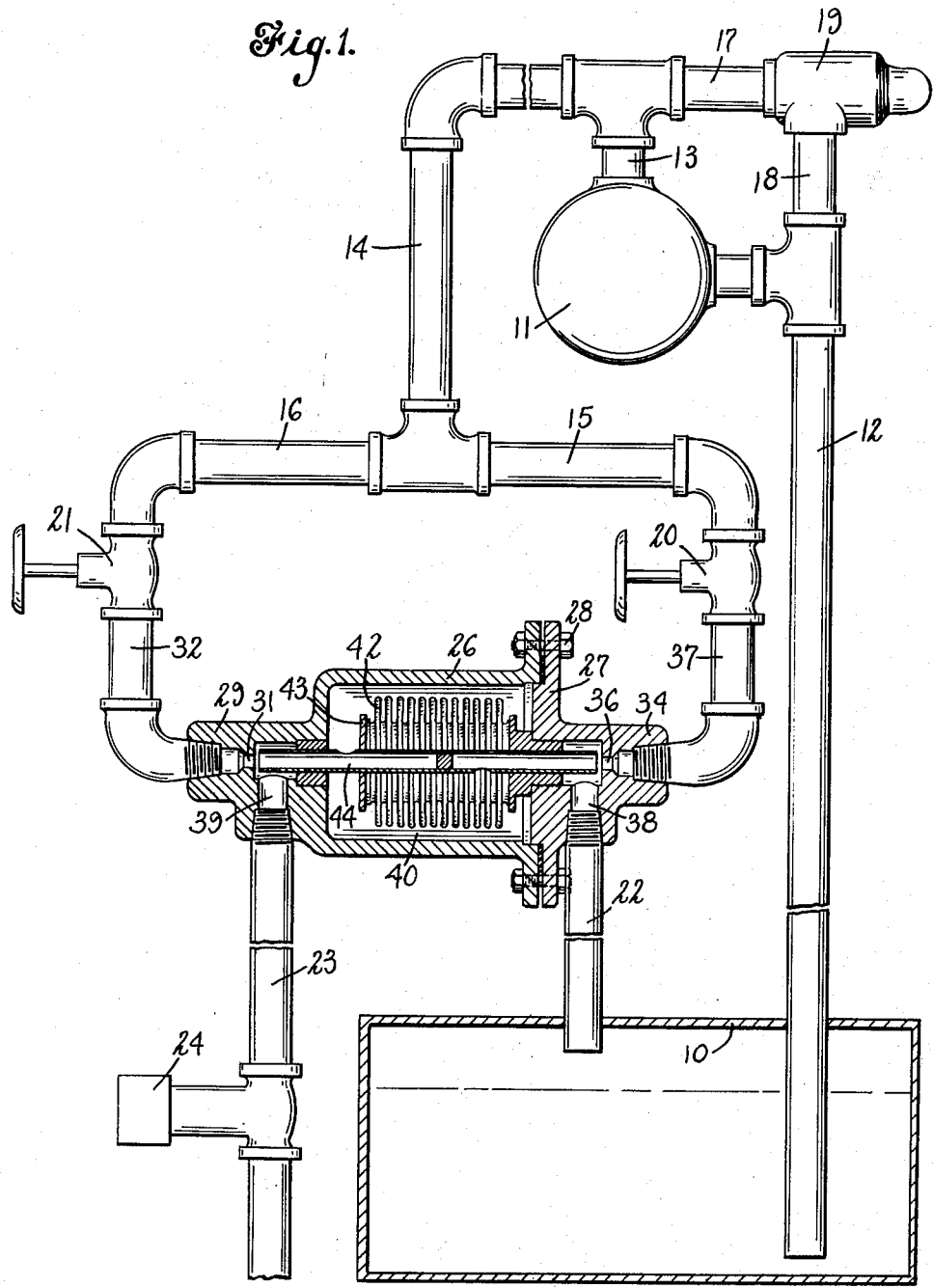
Fig. 1 is a partly diagrammatic and partly sectional view showing a fluid control device in accordance with my invention.

To illustrate a preferred embodiment of my invention, I have shown in Fig. 1 of the drawing an oil delivery system comprising a tank or other source of supply 10, the tank being connected to a pump 11 by the pipe 12. The discharge side of the pump delivers the oil through a pipe 13 to a pipe 14, the path of the oil then being divided to flow through the pipes 15 and 16.

As will be later explained, the oil delivered through the pipes 15 and 16 is regulated by valves which may be manually controlled or set and, as sometimes these valves may be closed, it is desirable to provide a bypass about the pump. Such an arrangement is provided in the structure of the pipes 17 and 18 which are connected through a pressure-regulating valve 19 so that the oil may be circulated over this path by the pump when the burner may be shut down and the pump continues its operation.

The quantity of oil that flows through the pipe 15 may be regulated by the regulating valve 20, and likewise that which flows through the pipe 16 may be regulated by the regulating valve 21. It will be understood that the oil which flows through the pipe 15 will be returned to the tank 10 through the pipe 22, as will be hereinafter more fully explained, and likewise the oil which is delivered through the pipe 16 will be delivered to the pipe 23 where it will pass to the burner or other point of consumption through the valve 24. It will be obvious, that as the oil is divided into the two paths to flow through the pipes 15 and 16 past the regulating valves 20 and 21 respectively, the relative effective openings at which these valves are set will determine the ratio or proportion of oil that flows in one path as compared to that which flows in the other path, if the pressure drop past these valves is equal. As the pressure in the pipe 15 will always be the same as that in the pipe 16, the pressure on the supply sides of the valves 20 and 21 will always be equal. Therefore, if the pressures on the delivery sides of these valves are also equal, then the ratio of fluid that flows by one of the valves to that which flows by the other valve will be determined by the setting of the valves. It will follow that once the valves 20 and 21 have been set to deliver the required amount of flow to the burner through the pipe 23, this flow will always remain constant so long as the pressures upon the delivery side of the valves 20 and 21 remain equal. The device for maintaining this relation will now be described.

Figure 2:
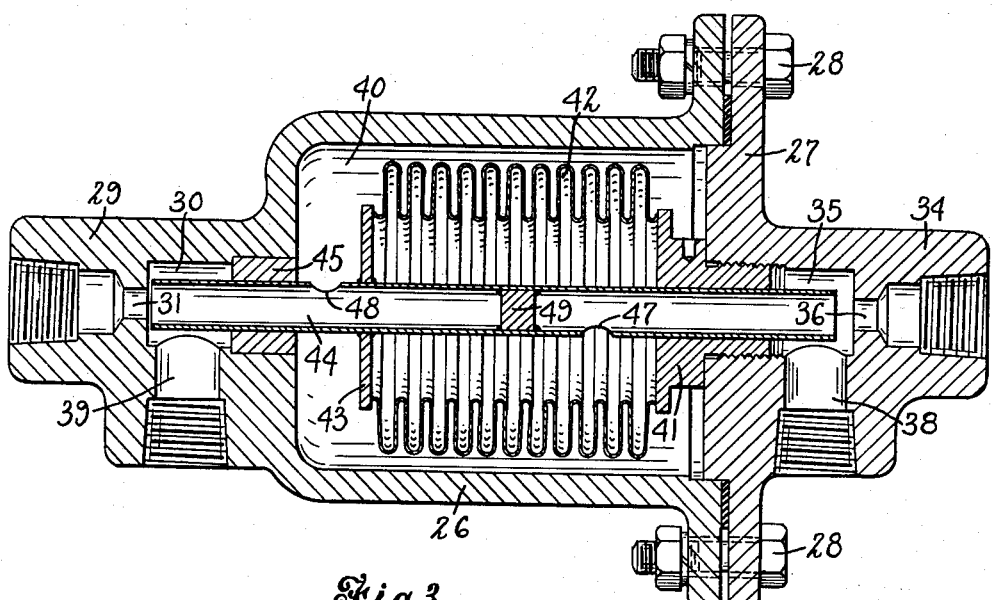
Fig. 2 is an enlarged sectional view through the housing of the control valve.
Figure 3:
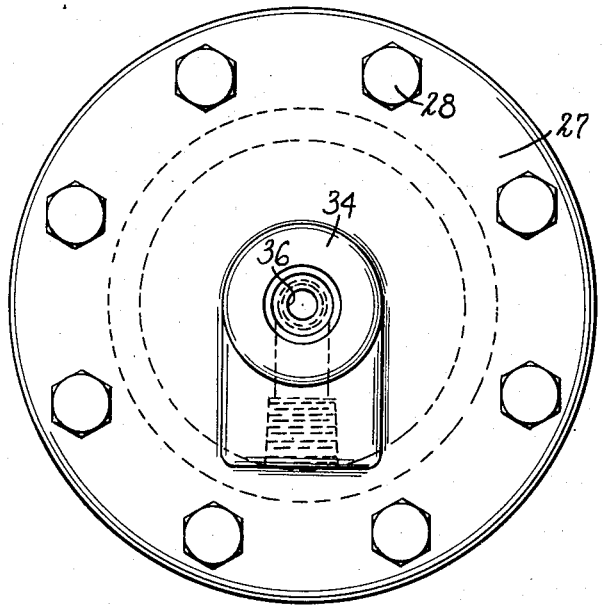
Fig. 3 is an end view looking toward the left in Fig. 2.

As shown in section in Fig. 1 and in the enlarged sectional view of Fig. 2, I provide a valve-controlling mechanism comprising a casing 26 closed at one end by a cap 27 secured to the casing by bolts 28. At the left-hand end of this casing is an extension 29 within which is provided a chamber 30, this chamber being in communication with the pipe 16 through the orifice 31, pipe 32 and the valve 21 previously referred to.

Likewise the cap 27 is provided with an extension 34 having therein a chamber 35, this chamber being in communication with the pipe 15 through the orifice 36, the pipe 37 and the valve 20. Also, the chamber 35 is in communication with the supply tank 10 through the orifice 38 and pipe 22, while the chamber 30 is in communication with the burner or other point of delivery through the orifice 39, pipe 23 and valve 24.

Within the casing 26 is a chamber 40 and a bushing or gland 41 which is threaded into an opening in the cap 27 and extends into the chamber, the bushing having secured to its inner end a collapsible bellows 42, so that the interior of the bellows is sealed off from the chamber 40.

Secured to the other end 43 of the bellows is a tubular member 44 which extends without the chamber 40 at both ends. At the right-hand end the member 44 extends slidably through the gland or bushing 41 into the chamber 35, and its end is in open communication with the space within this chamber. At the other end the tubular member 44 extends slidably through a bushing 45 into the chamber 30 where it is in open communication with the space within this chamber.

An opening 47 is provided in the wall of the tubular member 44 within the bellows 42, and an opening 48 is provided in the member 44 within the chamber 40. A liquid-tight partition 49 is provided in the member 44 between the openings 47 and 48, and it will also be understood that the connection between the member 44 and the end 43 of the bellows is also fluid tight so that, as shown in Figs. 1 and 2, the right-hand end of the tubular member (which, as will be seen, serves as a valve member) will not only be in communication with the chamber 35 but also with the space within the bellows 42, while the left-hand end of the tubular member 44 will not only be in communication with the chamber 30 but also will be in communication with the chamber 40 without the bellows.

It will be understood that so long as the pressure in the chamber 40 on the outside of bellows 42 is equal to that existing within the bellows, no movement of the member 43 will take place. As the pressure in the chamber 40 differs from that existing within the bellows 42, the member 43 will be moved in one direction or the other as the other end of the bellows is fixed to the bushing 41. The movement of the member 43 will effect movement of the tubular valve member 44 in the same direction.

The ends of the tubular valve member extend in sufficiently close proximity to the ports 31 and 36 that the effective opening of these ports is controlled thereby, and likewise the quantity of fluid flowing into the chambers 30 and 35 and through the ports 38 and 39 leading from these chambers. The ports 31 and 36, however, are always in free communication with the interior of the tubular member 44 so that the port 31 will always be in communication with the chamber 40, and likewise the port 36 will always be in communication with the interior of the bellows 42. Therefore, the pressure outside of the bellows will always be that in the line 32, while the pressure within the bellows will always be that within the line 37.

It will be apparent that if pressure in the line 32 or that existing on the outside of the bellows is always maintained equal to that in the line 37 or that existing within the bellows, the pressure drop past the valve 20 will be equal to the pressure drop past the valve 21, and hence the fluid flowing by these valves will be in direct proportion to the valve openings, and, as will now be explained, my flow-controlling device, just described, will maintain the pressure in the lines 32 and 37 at an equal value as the valve member 44 will be moved in one direction or the other to the extent to maintain the pressure in chamber 40 outside of the bellows equal to that within the bellows.

Referring to Fig. 1, it will be seen that the tubular member 44 is in its substantially intermediate position wherein its ends are substantially equally distant from the ports 31 and 36 respectively. Suppose, for example, the valves 20 and 21 have been set so that 75% of the oil is delivered to the burner through the pipe 23 and 25% of the oil is returned to the tank 10, and this relation will, of course, obtain so long as pressures in pipes 32 and 37 are equal. Assume, however, that changes in resistance to flow occur such as might be due to changes in viscosity, for example, and a lesser resistance is offered to flow through the pipe 23 than before while that in pipe 22 remains the same. This would tend to increase the volume of oil flowing to the burner through pipe 23, and at the same time would lower the pressure in pipe 32, which reduction in pressure would be reflected by the oil passing through the port 31 and through the left hand end of the tubular valve 44 into the chamber 40 so that there would be a lesser pressure in chamber 40 on the outside of the bellows 42 than that existing on the inside of the bellows, thus causing a movement of the member 43 and the tubular valve member 44 to the left, as shown, for example, in Fig. 2, wherein the left-hand end of the member 44 would be closer to the port 31 than would be the right-hand end to the port 36. Thus the flow through the port 31 into the chamber 30 and out through the pipe 23 will have been reduced as the communication between the port 31 and the chamber 30 has been lessened due to the restriction of the port 31 by the valve member. It will be noted, however, that this restriction of the port 31 by the valve member does not affect the flow into the valve member 44 which is still in free communication with the port 31 so that the restriction of the port 31 in this manner will not affect subsequent operation of the device in any way.

The movement of the valve member 44 to the left by restricting opening 31 in cutting down the flow through the path 23 will tend to raise the pressure in the pipe 32 and likewise the movement of the right-hand end of the valve member 44 away from the port 36 will tend to increase the flow through the pipe 22 and lower the pressure in the pipe 37. When these two pressures (those in pipes 32 and 37) become equal, movement of the valve member 44 will stop and the ratio of the oil delivered through pipes 22 and 23 will be that for which the valves 20 and 21 have been originally set. It will be understood, therefore, that once the valves have been set to deliver a given amount of oil through the pipe 22, this will be maintained at a constant quantity, assuming, of course, that the quantity delivered through the pipe 14 remains constant, as will be the case with the use of a constant displacement pump.

I have, therefore, provided a device which will maintain a constant flow of liquid such as oil, for example, through a pipe regardless of changes in resistance to flow in that the pressure drop past the valve 21 will always be equal to that past the valve 20 and, as long as the valve openings remain the same and the pressure drop past the valves remains equal, the quantity of oil which flows by the valve 21 will always be constant.

It will be understood that the invention is not limited to a structure in which the regulating valves 20 and 21 are employed as fixed orifices may be substituted for these valves, and so long as the orifices do not change, the quantity of fluid flowing in each path will remain constant. If the orifices which are provided have the desired ratio as to their area, then the proper quantity of fluid will be delivered to the burner or other point of delivery.

While I have shown and described a preferred embodiment of my invention, it will be understood that it is not to be limited to all of the details shown, but is capable of modification and variation within the spirit of the invention and within the scope of the claims.

What I claim is:

1. A fluid flow control apparatus comprising means for dividing a fluid flow along two paths, a regulating valve in each of said paths, a casing providing a chamber having a collapsible bellows therein and sealed therefrom, said casing having a port in communication with each of said paths, tubular means carried by a movable wall of said bellows and adapted to throttle said ports, and said tubular means providing communication between one of said ports and said chamber and between the other said ports and the interior of the bellows.

2. A fluid flow control apparatus comprising means for dividing a fluid flow along two paths, a regulating valve in each of said paths, a casing providing a chamber, a collapsible bellows dividing the chamber into two compartments and having a movable wall, said casing having aligned inlet ports, one communicating with each of said paths, tubular throttling means for said ports movably mounted in the casing, and said means being secured to said movable wall and providing communication between each of said compartments and one of the ports.

3. A fluid flow control apparatus comprising means for dividing a fluid flow along two paths, a regulating valve in each of said paths, a casing providing a chamber, a collapsible bellows dividing the chamber into two compartments and having a movable wall, said casing having aligned inlet ports, one communicating with each of said paths, tubular throttling means for said ports movably mounted in the casing, said means being secured to said movable wall and providing communication between each of said compartments and one of the ports, and said casing having an outlet port for each flow path.

4. A fluid flow control apparatus comprising means for dividing a fluid flow along two paths, a regulating valve in each of said paths, a casing having a hollow interior portion, a collapsible bellows dividing said interior into two compartments and having a movable wall, said casing also being provided with a chamber on each side of said hollow interior portion, each of said chambers having an inlet port communicating with one of said paths, and an outlet port, tubular valve means connected to the movable wall of said bellows, said means communicating at one end with one of said inlet ports, and at the other end with the other of said inlet ports and serving to throttle said ports, and an opening leading from said tubular valve means into each of said compartments.

5. In an apparatus of the character described, means for delivering a constant quantity of fluid and dividing said fluid to flow along two paths, a regulating valve in each path to adjust the proportion of the total quantity of fluid flowing through such path, means to maintain an equal pressure drop past said valves, said means comprising a collapsible bellows subjected, on one side, to pressure in one of said paths on the delivery side of the valve, and subjected on the other side to pressure existing in the other path on the delivery side of the regulating valve of that path, and constricting means carried by the movable wall of the bellows to exert a throttling effect on the flow in one path and the opposite effect on the flow in the other path when said bellows is actuated, said constricting means comprising tubular members, each having an open end to receive fluid from one of said paths and exert a throttling effect on the flow of such fluid, and one of said members communicating with the space without said bellows, and the other communicating with the space within said bellows.

6. A fluid flow control apparatus comprising means for dividing a fluid flow along two paths, a regulating valve in each of said paths, a casing having a hollow interior portion, a collapsible bellows dividing said interior into two compartments and having a movable wall, said casing also being provided with a chamber on each side of said hollow interior portion, each of said chambers having an inlet port communicating with one of said paths, and an outlet port, a tubular member connected at an intermediate portion thereof to the movable wall of said bellows, said member having open ends, one disposed adjacent each of said inlet ports and serving to throttle said ports, said member having openings in its side wall, one leading into each of said compartments, and a partition between said openings, and one end of said member moving away from the adjacent port when the other moves toward the port adjacent thereto.

HAROLD A. LINES.

References Cited in the file of this patent

UNITED STATES PATENTS

| Number | Name | Date |
|---|---|---|
| 2,059,104 | Harrah | Oct. 27, 1936 |
| 2,488,221 | Moore | Nov. 15, 1949 |
| 2,597,177 | Plass | May 20, 1952 |